| (12) | United States Patent | (10) Patent No.: | US 12,225,624 B2 |
|---|---|---|---|
| | Degot | (45) Date of Patent: | Feb. 11, 2025 |

(54) ELECTRONIC DEVICE

(71) Applicant: STMicroelectronics (Rousset) SAS, Rousset (FR)

(72) Inventor: Yannick Degot, Pourcieux (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 337 days.

(21) Appl. No.: 17/548,171

(22) Filed: Dec. 10, 2021

(65) Prior Publication Data

US 2022/0191680 A1 Jun. 16, 2022

(30) Foreign Application Priority Data

Dec. 14, 2020 (FR) ........................................ 2013185

(51) Int. Cl.
 *H04W 8/18* (2009.01)
 *H03K 19/00* (2006.01)
 (Continued)

(52) U.S. Cl.
 CPC ........ *H04W 8/183* (2013.01); *H03K 19/0016* (2013.01); *H04W 8/205* (2013.01); *H04W 8/22* (2013.01); *H04W 12/35* (2021.01)

(58) Field of Classification Search
 None
 See application file for complete search history.

(56) References Cited

U.S. PATENT DOCUMENTS

| 2011/0237297 | A1 | 9/2011 | Shin | |
|---|---|---|---|---|
| 2013/0260830 | A1* | 10/2013 | Zhao | H04W 8/183 455/558 |

(Continued)

FOREIGN PATENT DOCUMENTS

| CN | 1381809 A | 11/2002 |
|---|---|---|
| CN | 101478840 B | * 9/2010 |

(Continued)

OTHER PUBLICATIONS

INPI Search Report and Written Opinion for priority application, FR 2013185, report dated Aug. 27, 2021, 9 pages.

(Continued)

*Primary Examiner* — Jinsong Hu
*Assistant Examiner* — Alexander J Yi
(74) *Attorney, Agent, or Firm* — Crowe & Dunlevy LLC

(57) ABSTRACT

An electronic device includes a modulator-demodulator circuit, a first integrated circuit for implementing a first subscriber module; and a second integrated circuit for implementing a second subscriber identification module. A data transmit-receive terminal of the first integrated circuit and a data transmit-receive terminal of the second integrated circuit are connected to a data transmit-receive terminal of the modulator-demodulator circuit. Reset terminals of the modulator-demodulator circuit and the first integrated circuit are connected so that the modulator-demodulator circuit can control deactivation of the first integrated circuit. A reset terminal of the second integrated circuit and an input/output terminal of the first integrated circuit are connected so that the first integrated circuit can control deactivation of the second integrated circuit. Select terminals of the modulator-demodulator circuit and the first integrated circuit are connected so that the modulator-demodulator circuit can control selection functions for controlling selection of the second integrated circuit.

25 Claims, 4 Drawing Sheets

(51) Int. Cl.
*H04W 8/20* (2009.01)
*H04W 8/22* (2009.01)
*H04W 12/30* (2021.01)

(56) References Cited

U.S. PATENT DOCUMENTS

2019/0069224 A1* 2/2019 Lee .................. H04W 48/16
2022/0159447 A1* 5/2022 Chikkala ............... H04W 8/205

FOREIGN PATENT DOCUMENTS

| | | | |
|---|---|---|---|
| CN | 108605220 A | 9/2018 | |
| EP | 2159666 A1 * | 3/2010 | ........... G06F 1/3203 |
| EP | 2244528 A1 | 10/2010 | |
| GB | 2504968 A * | 2/2014 | ......... H04L 63/0853 |

OTHER PUBLICATIONS

Ni Qing, Design Verification of 8-bit CMOS Microcontroller HR6P73PGDA, Nov. 15, 2006, China Outstanding doctoral master 's degree thesis series.

Notice of Allowance and Search Report for Grant Notification from counterpart CN Appl. No. 202111521804.2, report dated May 2, 2023, 7 pgs.

* cited by examiner

ELECTRONIC DEVICE

PRIORITY CLAIM

This application claims the priority benefit of French Application for Patent No. 2013185, filed on Dec. 14, 2020, the content of which is hereby incorporated by reference in its entirety to the maximum extent allowable by law.

TECHNICAL FIELD

The present disclosure generally concerns electronic devices. The present disclosure more particularly concerns wireless communication devices implementing a plurality of subscriber identity modules (SIMs).

BACKGROUND

Wireless communication devices comprising a plurality of integrated circuits each implementing a subscriber identification module (SIM) are known. Some of these circuits may form part of a removable microcircuit card, or SIM card, inserted by a user in a dedicated location of the device. Other circuits may form part of an irremovable electronic chip, soldered in factory on a printed circuit board of the device.

The presence of a plurality of these circuits, removable or not, in a same device enables the user to access extended wireless communication functionalities. However, the integration of such circuits causes a complexity and cost increase of the devices.

There is a need to improve current wireless communication electronic devices implementing a plurality of subscriber identification modules.

SUMMARY

An embodiment overcomes all or part of the disadvantages of known wireless communication electronic devices implementing a plurality of subscriber identification modules.

An embodiment provides an electronic device comprising: a modulator-demodulator circuit; a first integrated circuit implementing a first subscriber identification module; and at least one second integrated circuit intended to implement a second subscriber identification module, wherein a data transmit-receive terminal of the first circuit and a data transmit-receive terminal of the second circuit are connected to a same data transmit-receive terminal of the modulator-demodulator circuit.

According to an embodiment, a reset terminal of the second circuit is connected to a first terminal of the first circuit.

According to an embodiment, the first terminal of the first circuit is adapted to applying, to the reset terminal of the second circuit, a signal for deactivating the second circuit.

According to an embodiment, a second terminal of the first circuit, associated with the first terminal, is connected to a third terminal of the modulator-demodulator circuit.

According to an embodiment, the third terminal is adapted to applying the signal for deactivating the second circuit to the second terminal.

According to an embodiment, a sequencing terminal of the first circuit and a sequencing terminal of the second circuit are connected to a same sequencing terminal of the modulator-demodulator circuit.

According to an embodiment, a power supply terminal of the first circuit and a power supply terminal of the second circuit are connected to a same power supply terminal of the modulator-demodulator circuit.

According to an embodiment, a reset terminal of the first circuit is connected to a reset terminal of the modulator-demodulator circuit.

According to an embodiment, the reset terminal of the modulator-demodulator circuit is configured to apply, to the reset terminal of the first circuit, a signal for deactivating the first circuit.

According to an embodiment, the data transmit-receive terminals of the modulator-demodulator circuit and of the first and second circuits each form part of a standardized ISO 7816 communication interface.

According to an embodiment, the first circuit is an embedded universal integrated circuit card.

According to an embodiment, each second circuit is selected from among: a location intended to receive a universal integrated circuit card; an embedded universal integrated circuit card (eUICC); and an integrated universal integrated circuit card (iUICC).

An embodiment provides a motor vehicle comprising a device such as described.

An embodiment provides a method of controlling a device such as described, comprising the step of processing a data signal by the first circuit or by the second circuit according to a state of the signal for deactivating the second circuit.

According to an embodiment, the first circuit is deactivated when the second circuit is activated.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the generation of the wireless communication signals and the interpretation thereof have not been detailed, the described embodiments being compatible with usual techniques of generation and interpretation of these signals.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., unless otherwise specified, it is referred to the orientation of the drawings.

Unless specified otherwise, the expressions "around", "approximately", "substantially" and "in the order of" signify within 10%, and preferably within 5%.

Figure 1:
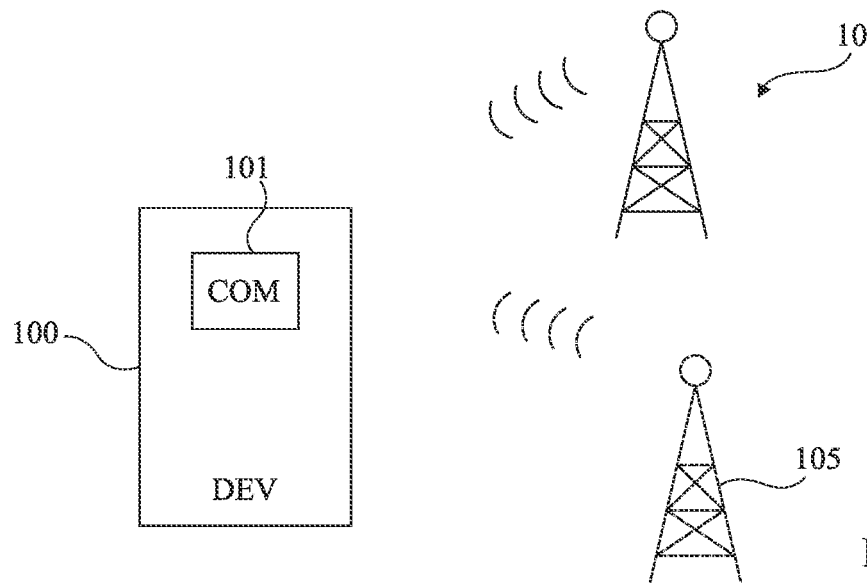
FIG. 1 schematically shows in the form of blocks an example of a wireless communication system of the type to which the described embodiments apply as an example.

FIG. 1 schematically shows in the form of blocks, an example of a wireless communication system of the type to which the described embodiments apply as an example.

In the shown example, the system comprises a wireless electronic communication device (DEV) 100. Device 100 is, for example, a radio frequency communication device. Device 100 comprises, in this example, a wireless communication circuit (COM) 101. Circuit 101, for example, enables device 100 to receive and to transmit data over a first communication network, symbolized in FIG. 1 by an antenna 103. As an example, device 100 forms part of a motor vehicle, of a cell phone, of a touch pad, of a personal computer, of a connected object, etc.

As illustrated in FIG. 1, communication circuit 101 may further enable device 100 to receive and to transmit data over a second communication network, symbolized in FIG. 1 by another antenna 105. As an example, the antennas of first and second communication networks 103 and 105 each form part of a different telecommunication infrastructure. These infrastructures are, for example, operated by different wireless network operators or service providers.

Generally, each communication network 103, 105, for example, enables device 100 to communicate with other devices, not shown in FIG. 1. These other devices are, for example, similar to device 100.

Device 100, for example, alternately exchanges data with one and the other of networks 103 and 105. This, for example, enables device 100 to transmit and to receive data, messages, phone calls, etc. by using either network 103, or network 105. As an example, this enables device 100 to communicate by using one of networks 103, 105 in case of an unavailability of the other network 105, 103.

Figure 2:
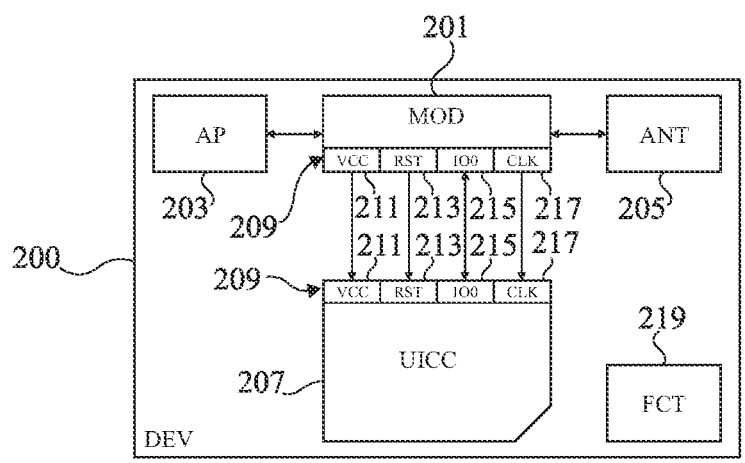
FIG. 2 schematically shows in the form of blocks an example of a wireless electronic communication device.

FIG. 2 schematically shows in the form of blocks, an example of a wireless electronic communication device (DEV) 200 of the type of the device 100 of FIG. 1. FIG. 2 more precisely illustrates the case of a device 200 comprising a single circuit adapted to implement a subscriber identity module (SIM).

In the shown example, device 200 comprises a modulator-demodulator circuit (MOD) 201 or modem. Modem 201 is, for example, coupled to a microprocessor (AP) 203 of device 200. Microprocessor 203 is, for example, a main application processor of device 200. As an example, microprocessor 203 is soldered to a printed circuit board (not shown), for example, a motherboard, of device 200. Modem 201 is, for example, also soldered on the motherboard of device 200.

In the shown example, modem 201 is further coupled to an antenna (ANT) 205 of device 200. Antenna 205 is, for example, a radio frequency (RF) antenna, capable of transmitting and or receiving communication signals over one or a plurality of frequency bands. Although this has not been shown in FIG. 2, antenna 205 is, for example, coupled to modem 201 by an impedance matching circuit. Further, device 200 may comprise at least one electromagnetic filter (not shown), configured to attenuate or remove electromagnetic disturbances likely to affect signals received or transmitted by antenna 205.

In the shown example, modem 201 is connected to an integrated circuit (UICC) 207. Modem 201 and integrated circuit 207, for example, each comprise a communication interface 209. The communication interfaces 209 of modem 201 and of circuit 207 are, for example, connected to each other, for example by conductive tracks of the printed circuit board of device 200. As an example, the communication interfaces 209 of modem 201 and of integrated circuit 207 are standardized ISO 7816 communication interfaces.

In this example, each communication interface 209 comprises: a power supply terminal (VCC) 211; a reset terminal (RST) 213; a data transmit-receive terminal (IO0) 215; and a sequencing terminal (CLK) 217.

In the shown example, modem 201 and circuit 207 exchange signals and data via their respective communication interfaces 209. For a communication between modem 201 and integrated circuit 207, the interface 209 of modem 201 is, for example, configured as a master interface while the interface 209 of circuit 207 is configured as a slave interface.

More particularly, in the shown example: the terminal 211 of interface 209 of modem 201 is configured to apply a power supply signal VCC to the terminal 211 of the interface 209 of circuit 207; the terminal 213 of the interface 209 of modem 201 is configured to apply a reset signal RST to the terminal 213 of the interface 209 of circuit 207; the terminal 215 of the interface 209 of modem 201 is configured to transmit data signals IO0 to the terminal 215 of the interface 209 of circuit 207 and to receive data signals IO0 transmitted by the terminal 215 of the interface 209 of circuit 207; and the terminal 217 of the interface 209 of modem 201 is configured to apply a sequencing or clock signal CLK to the terminal 217 of the interface 209 of circuit 207.

The integrated circuit 207 of device 200 is, for example, a location or housing intended to receive a removable microcircuit card. This microcircuit card is, for example, a universal integrated circuit card (UICC), also called subscriber identity module (SIM) or, more simply, SIM card. In this case, integrated circuit 207, for example, comprises contacting elements (not shown) enabling to connect pads of the SIM card to terminals 211, 213, 215, and 217 of the interface 209 of circuit 207.

The SIM card is, for example, supplied independently from device 200. As an example, the SIM card is obtained by a user of device 200 by a telecommunication operator, for example, the operator of the network 103 of FIG. 1. The SIM card is then, for example, inserted into location 207 by the user, to enable device 200 to communicate by using network 103.

To enable device 200 to communicate by using another network, for example, the network 105 of FIG. 1, the user is, for example, compelled to acquire another SIM card. This other SIM card is, for example, supplied by the telecommunication operator operating network 105. By, for example, replacing the SIM card of the operator of network 103 with that of the operator of network 105 in location 207, the user then enables device 200 to communicate by using network 105.

As a variant, integrated circuit 207 is a non-removable circuit implementing a subscriber identification module (SIM). Circuit 207 is then, for example, an embedded universal integrated circuit card (eUICC), also called embedded subscriber identity module (eSIM). In this case, integrated circuit 207, for example, forms part of an electronic chip attached to a printed circuit board (not shown) of device 200. As an example, the electronic chip comprising circuit 207 is soldered to the motherboard of device 200. Integrated circuit 207 may alternately be an integrated universal integrated circuit card (iUICC), also called integrated subscriber identity module (iSIM). In this case, integrated circuit 207, for example, forms part of the microprocessor 203 of device 200.

In the variant where integrated circuit 207 is a non-removable embedded or integrated universal integrated circuit card, circuit 207 is present in device 200 after manufacturing. To enable device 200 to communicate by, for example, using the network 103 of FIG. 1, a SIM profile is, for example, stored in a memory area (not shown) of circuit 207. This SIM profile is, for example, downloaded by the user of device 200 from a data server operated by the operator of network 103.

To enable device 200 to communicate by using another network, for example the network 105 of FIG. 1, the user has to download another SIM profile, for example. This other SIM profile is, for example, made available to the user by the telecommunication operator operating network 105. By, for example, storing the SIM profile of the operator of network 105 into the memory of circuit 207, the user then enables device 200 to communicate by using network 105. According, in particular, to a memory capacity of circuit 207, the SIM profile of the operator of network 105 may be stored instead of or as a complement to the SIM profile of the operator of network 103.

Device 200 may further comprise one or a plurality of other elements. These elements are symbolized, in FIG. 2, by a functional block (FCT) 219.

Figure 3:
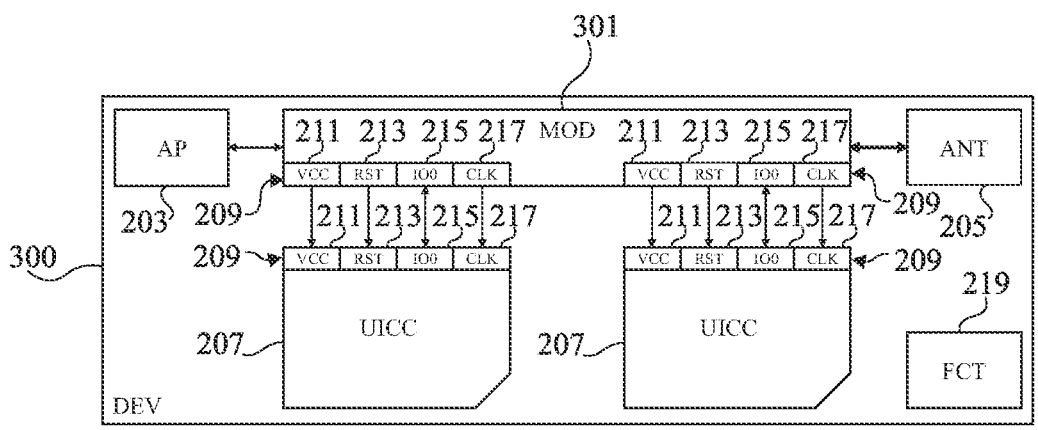
FIG. 3 schematically shows in the form of blocks another example of a wireless electronic communication device.

FIG. 3 schematically shows in the form of blocks another example of a wireless electronic communication device (DEV) 300 of the type of the device 100 of FIG. 1. FIG. 3 more precisely illustrates the case of a device comprising two circuits adapted to each implementing a subscriber identification module.

The device 300 of FIG. 3 comprises elements common with the device 200 of FIG. 2. These common elements will not be detailed again hereafter. The device 300 of FIG. 3 differs from the device 200 of FIG. 2 mainly in that device 300 comprises, instead of modem 201, a modem 301 (MOD) comprising two communication interfaces 209.

In the shown example, the modem 301 of device 300 is connected to two integrated circuits 207 (UICC). One of the communication interfaces 209 of modem 301 is, for example, connected to the communication interface 209 of one of integrated circuits 207, while the other communication interface 209 of modem 301 is connected to the communication interface 209 of the other integrated circuit 207.

More precisely, in the shown example: the terminals 211, 213, 215, and 217 of one of the interfaces 209 of modem 301 are respectively connected to the terminals 211, 213, 215, and 217 of the interface 209 of one of circuits 207; and the terminals 211, 213, 215, and 217 of the other interface 209 of modem 301 are respectively connected to the terminals 211, 213, 215, and 217 of the interface 209 of the other circuit 207.

The communication interfaces 209 of modem 301 are, for example, connected to the communication interfaces 209 of circuits 207 by conductive tracks of a printed circuit card of device 300. As an example, the communication interfaces 209 of modem 301 are standardized ISO 7816 communication interfaces.

In the shown example, modem 301 and circuits 207 exchange signals and data via their respective communication interfaces 209. For a communication between modem 301 and integrated circuits 207, the interfaces 209 of modem 301 are, for example, configured as master interfaces while the interface 209 of each circuit 207 is configured as a slave interface.

More precisely, in the shown example: the terminals 211, 213, and 217 of each interface 209 of modem 301 are configured to apply signals VCC, RST, and CLK to the terminals 211, 213, and 217 of the interface 209 of the circuit 207 to which they are respectively connected; and the terminal 215 of each interface 209 of modem 301 is configured to transmit data signals IO0 to the terminal 215 of the interface 209 of the circuit 207 to which it is connected and to receive the data signals IO0 transmitted by the terminal 215 of the interface 209 of the circuit 207 to which it is connected.

According to the targeted application, each circuit 207 may, as previously discussed in relation with FIG. 2, receive a SIM card or store a SIM profile. As an example, one of the circuits 207 of device 300 receives a SIM card, or stores a SIM profile, enabling to access a network different from a network capable of being used due to a SIM card inserted into, or a SIM profile stored in, the other circuit 207. One of circuits 207, for example, implements a subscriber identification module enabling device 300 to communicate by using the network 103 of FIG. 1. The other circuit 207, for example, implements a subscriber identification module enabling device 300 to communicate by using the network 105 of FIG. 1.

A disadvantage of device 300 lies in the fact that modem 301 comprises two communication interfaces 209. These two interfaces 209 cause a size, complexity, and cost increases of modem 301, and thus of device 300.

Figure 4:
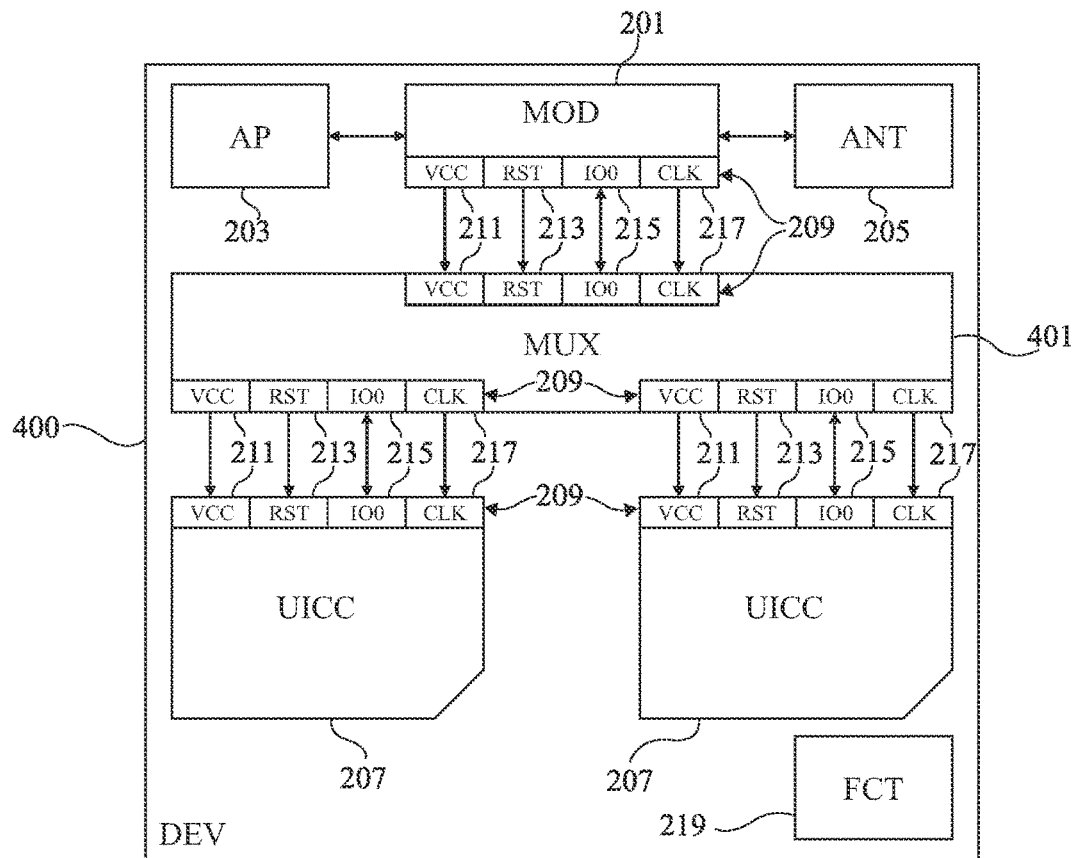
FIG. 4 schematically shows in the form of blocks still another example of a wireless electronic communication device.

FIG. 4 schematically shows in the form of blocks still another example of a wireless electronic communication device (DEV) 400 of the type of the device 100 of FIG. 1. FIG. 4 more particularly illustrates the case of a device comprising a modem coupled, by a multiplexer (MUX) 401, to two circuits adapted to each implementing a subscriber identification module.

The device 400 of FIG. 4 comprises elements common with the device 200 of FIG. 2. Such common elements will not be detailed again hereafter. The device 400 of FIG. 4 differs from the device 200 of FIG. 2 mainly in that device 400 comprises a multiplexer (MUX) 401 and two integrated circuits (UICC) 207.

In the shown example, the modem (MOD) 201 of device 400 is connected to multiplexer 401. Multiplexer 401, for example, comprises three communication interfaces 209. As illustrated in FIG. 4, multiplexer 401 for example comprises an interface 209 connected to the interface 209 of modem 201 and two other interfaces 209, each connected to the interface 209 of one of integrated circuits 207.

More particularly, in the shown example: the terminals 211, 213, 215, and 217 of one of the interfaces 209 of multiplexer 401 are respectively connected to the terminals 211, 213, 215, and 217 of the interface 209 of modem 201; and the terminals 211, 213, 215, and 217 of each of the other interfaces 209 of multiplexer 401 are respectively connected to the terminals 211, 213, 215, and 217 of the interface 209 of one of circuits 207.

The communication interfaces 209 of multiplexer 401 are, for example, connected to the communication interfaces 209 of modem 201 and of circuits 207 by conductive tracks of a printed circuit board of device 400. As an example, the communication interfaces of multiplexer 401 are standardized ISO 7816 communication interfaces.

In the shown example, modem 201 and circuits 207 exchange signals and data via multiplexer 400. For a communication between modem 201 and integrated circuits 207, the interface 209 of modem 301 and the interfaces 209 of multiplexer 401 connected to circuits 207 are, for example, configured as master interfaces while the interface 209 of the multiplexer connected to modem 201 and the interface 209 of each circuit 207 are configured as slave interfaces.

More precisely, in the shown example: the terminals 211, 213, and 217 of the interface 209 of modem 201 are configured to apply signals VCC, RST, and CLK to the terminals 211, 213, and 217 of the interface 209 of the multiplexer 401 connected to modem 201; the terminal 215 of the interface 209 of modem 201 is configured to transmit data signals IO0 to the terminal 215 of the interface 209 of multiplexer 401 connected to modem 201 and to receive the data signals IO0 transmitted by the terminal 215 of the interface 209 of multiplexer 401 connected to modem 201; the terminals 211, 213, and 217 of the interface 209 of multiplexer 401 connected to one of circuits 207 are configured to apply signals VCC, RST, and CLK to the terminals 211, 213, and 217 of the interface 209 of the associated circuit 207; and the terminal 215 of each interface 209 of multiplexer 401 connected to one of circuits 207 is configured to transmit data signals IO0 to the terminal 215 of the interface 209 of the associated circuit 207 and to receive the data signals IO0 transmitted by the terminal 215 of the interface 209 of the associated circuit 207.

As an example, multiplexer 401 is configured to direct signals VCC, RST, IO0, and CLK towards one or the other of the circuits 207 of device 400, for example, according to a control signal (not shown). This control signal is, for example, transmitted to multiplexer 401 by microprocessor 203 (AP). Multiplexer 401 is, for example, configured to enable modem 201 to exchange data signals IO0 with one or the other of circuits 207, for example, in alternation. In this case, multiplexer 401, for example, transmits the signals IO0 received from modem 201 to one or the other of circuits 207 according to the control signal.

As a variant, multiplexer 401 is, for example, configured to enable modem 201 to exchange data signals IO0 with the two circuits 207, for example, simultaneously. In this case, multiplexer 401 is, for example, configured to demultiplex the signals IO0 received from modem 201, and then to transmit these demultiplexed signals to each circuit 207. Multiplexer 401 is, for example, further configured to multiplex the signals IO0 received from circuits 207, and then to transmit these multiplexed signals to modem 201.

A disadvantage of device 400 lies in the fact that circuits 207 are coupled to modem 201 via multiplexer 401. The presence of multiplexer 401 causes an increase in the complexity, size, and cost of device 400.

Figure 5:
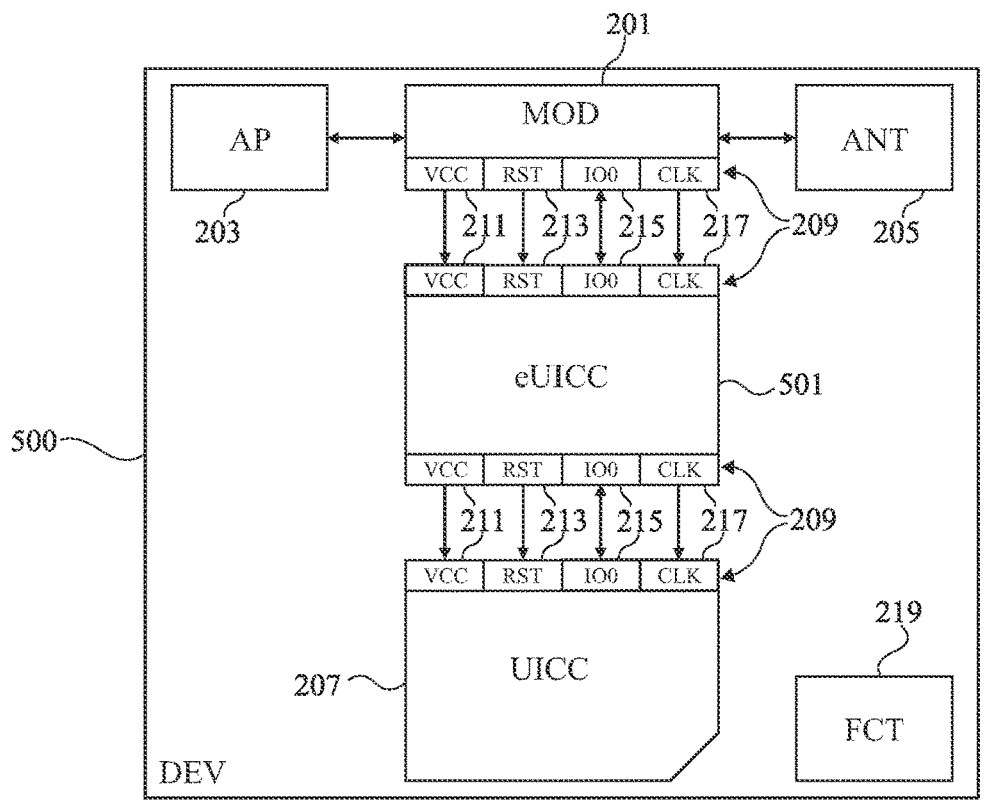
FIG. 5 schematically shows in the form of blocks still another example of a wireless electronic communication device.

FIG. 5 schematically shows in the form of blocks still another example of a wireless electronic communication device (DEV) 500 of the type of the device 100 of FIG. 1.

FIG. 5 more particularly illustrates the case of a device comprising two circuits adapted to each implementing a subscriber identification module, one of the circuits being coupled to a modem by the other circuit.

The device 500 of FIG. 5 comprises elements common with the device 200 of FIG. 2. Such common elements will not be detailed again hereafter. The device 500 of FIG. 5 differs from the device 200 of FIG. 2 mainly in that the integrated circuit (UICC) 207 of device 500 is coupled to modem (MOD) 201 via another integrated circuit (eUICC) 501.

In the shown example, the modem 201 and the circuit 207 of device 500 are each connected to circuit 501. Circuit 501, for example, comprises two communication interfaces 209 similar to those of modem 201 and of circuit 207. One of the communication interfaces 209 of circuit 501 is, for example, connected to the communication interface 209 of modem 201. The other communication interface 209 of circuit 501 is, for example, connected to the communication interface 209 of integrated circuit 207.

More precisely, in the shown example: the terminals 211, 213, 215, and 217 of one of the interfaces 209 of circuit 501 are respectively connected to the terminals 211, 213, 215, and 217 of the interface 209 of modem 201; and the terminals 211, 213, 215, and 217 of the other interface 209 of circuit 501 are respectively connected to the terminals 211, 213, 215, and 217 of the interface 209 of circuit 207.

The communication interfaces 209 of circuit 501 are, for example, connected to the communication interfaces 209 of modem 201 and of circuits 207 by conductive tracks of a printed circuit board of device 500. As an example, the communication interfaces 209 of multiplexer 501 are standardized ISO 7816 communication interfaces.

In the shown example, modem 201 and circuits 501, 207 exchange signals and data via their respective communication interfaces 209. For a communication between modem 201 and integrated circuits 501, 207, the interface 209 of modem 201 and the interface 209 of circuit 501 connected to circuit 207 are, for example, configured as master interfaces. The interface 209 of circuit 501 connected to modem 201 and the interface 209 of circuit 207 are, for example, configured as slave interfaces.

More precisely, in the shown example: the terminals 211, 213, and 217 of the interface 209 of modem 201 are configured to apply signals VCC, RST, and CLK to the terminals 211, 213, and 217 of the interface 209 of the circuit 501 to which they are respectively connected; and the terminal 215 of the interface 209 of modem 201 is configured to transmit data signals IO0 to the terminal 215 of the interface 209 of the circuit 501 to which it is connected and to receive the data signals IO0 transmitted by the terminal 215 of the interface 209 of the circuit 501 to which it is connected.

Further, in the shown example: the terminals 211, 213, and 217 of the interface 209 of circuit 501 connected to circuit 207 are configured to apply signals VCC, RST, and CLK to the terminals 211, 213, and 217 of the interface 209 of the circuit 207 to which they are respectively connected; and the terminal 215 of the interface 209 of the circuit 501 connected to circuit 207 is configured to transmit data signals IO0 to the terminal 215 of the interface 209 of circuit 207 and to receive the data signals IO0 transmitted by the terminal 215 of the interface 209 of circuit 501.

As a variant, signal VCC is transmitted to circuit 207 directly by modem 201. Circuit 207 then does not receive signal VCC from circuit 501. In this variant, the terminal 211 of the interface 209 of circuit 207 is connected to the terminal 211 of the interface 209 of model 201. The terminal 211 of the interface 209 of circuit 501 connected to modem 201 may be the same terminal as the terminal 211 of the interface 209 of circuit 501 connected to circuit 207.

According for example to the targeted application, each circuit 501, 207 may, as previously discussed in relation with FIG. 2, receive a SIM card or store a SIM profile. Circuit 501 is, for example, an embedded universal circuit card, eUICC. Circuit 207 is, for example, a location intended to receive a SIM card. As an example, circuit 501 stores a SIM profile, enabling to access a network different from the network capable of being used due to a SIM card inserted in circuit 207. Circuit 501, for example, implements a subscriber identification module enabling device 500 to communicate by using the network 103 of FIG. 1. The other circuit 207 is, for example, intended to implement a subscriber identification module enabling device 500 to communicate by using the network 105 of FIG. 1.

As an example, circuit 501 is configured to process signals VCC, RST, IO0, and CLK received from modem 201 or to transmitting these signals to circuit 207, for example according to a control signal, not shown. This control signal is, for example, transmitted to circuit 501 by microprocessor 203 (AP). Circuit 501 is, for example, configured to enable modem 201 to exchange data signals IO0 with one or the other of circuits 501, 207, for example, in alternation Circuit 501, for example, acts as a communication bridge between the modem 201 and the circuit 207 of device 500.

A disadvantage of device 500 lies in the fact that circuit 501 comprises an interface 209 configured as a master for the communication with circuit 207. The presence of this interface causes an increase in the size, complexity, and cost of circuit 501, and thus of device 500. Further, such an interface requires a software programming which is difficult to perform.

Figure 6:
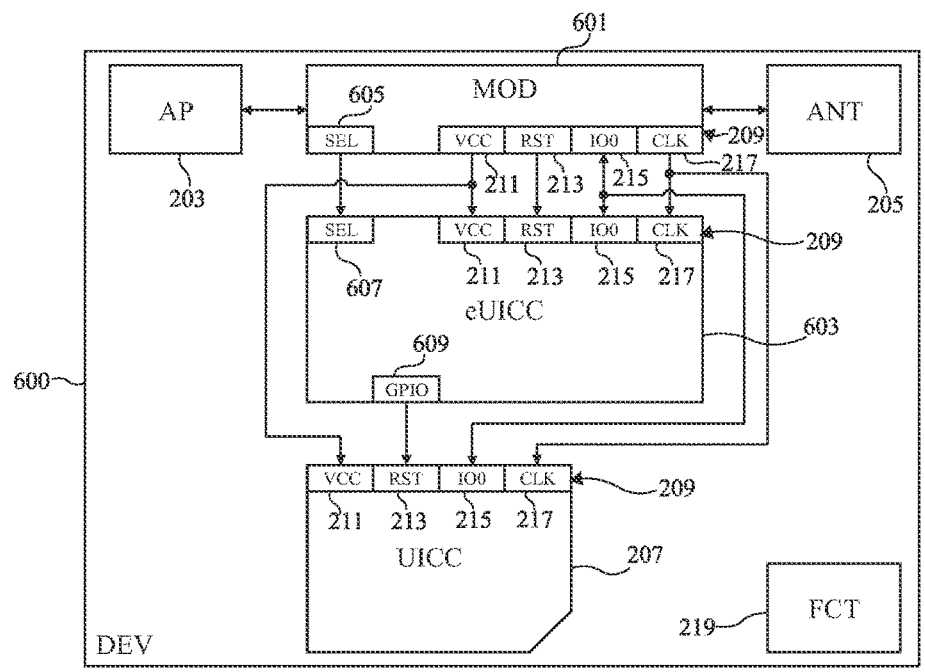
FIG. 6 schematically shows in the form of blocks an embodiment of a wireless electronic communication device.

FIG. 6 schematically shows in the form of blocks an embodiment of a wireless electronic communication device 600 (DEV) of the type of the device 100 of FIG. 1. FIG. 6 more particularly illustrates the case of a device comprising two circuits that are each configured to implement a subscriber identification module (SIM), these circuits being coupled to a same communication interface of a modem.

The device 600 of FIG. 6 comprises elements common with the device 200 of FIG. 2. Such common elements will not be detailed again hereafter. The device 600 of FIG. 6 differs from the device 200 of FIG. 2 mainly in that device 600 comprises, instead of modem 201, a modem (MOD) 601 connected to circuit (UICC) 207 and to another integrated circuit (eUICC or iUICC) 603.

In the shown example, the integrated circuits 603 and 207 of device 600 are each connected to modem 601. Circuit 603, for example, comprises a single communication interface 209 similar to that of circuit 207. Further, modem 601, for example, comprises a single communication interface 209 similar to that of circuit 207. The communication interface 209 of circuit 603 is, for example, connected to the communication interface 209 of modem 601. The communication interface 209 of circuit 207 is, for example, connected, except for its terminal 213, to the communication interface 209 of modem 601.

More precisely, in the shown example: the terminals 211, 213, 215, and 217 of the interface 209 of modem 601 are respectively connected to the terminals 211, 213, 215, and 217 of the interface 209 of circuit 603; and the terminals 211, 215, and 217 of the interface 209 of circuit 207 are respectively connected to the terminals 211, 215, and 217 of the interface 209 of modem 601.

The communication interface 209 of modem 601 is, for example, connected to the communication interfaces 209 of circuits 603 and 207 by conductive tracks of a printed circuit board of device 600. As an example, the communication interfaces 209 of modem 601 and of integrated circuit 603 are standardized ISO 7816 communication interfaces. As an example, the communication interfaces 209 of circuit 207 are standardized ISO 7816 communication interfaces.

In the shown example, modem 601 and circuits 603, 207 exchange signals and data via their respective communication interfaces 209. For a communication between modem 601 and integrated circuits 603, 207, the interface 209 of modem 601 is, for example, configured as a master interface. The interfaces 209 of circuits 603, 207 are, for example, configured as slave interfaces.

More precisely, in the shown example: the terminals 211 and 217 of the interface 209 of modem 601 are configured to apply signals VCC and CLK to the terminals 211 and 217 of the interface 209 of the circuit 603, 207 to which they are respectively connected; the terminal 213 of the interface 209 of modem 601 is configured to apply signal RST to the terminal 213 of the interface 209 of circuit 603; and the terminal 215 of the interface 209 of modem 601 is configured to transmit data signals IO0 to the terminal 215 of the interface 209 of the circuit 603, 207 to which it is connected and to receive the data signals IO0 transmitted by the terminal 215 of the interface 209 of the circuit 603, 207 to which it is connected.

In the shown example, modem 601 comprises a terminal (SEL) 605. The terminal 605 of modem 601 is, for example, connected to a terminal (SEL) 607 of integrated circuit 603. Terminal 605 is, for example, configured to apply, to the terminal 607 of circuit 603, a signal SEL for deactivating, resetting or deselecting circuit 207.

In the shown example, circuit 603 comprises another terminal (GPIO) 609. The terminal 609 of circuit 603 is, for example, connected to the terminal 213 of the communication interface 209 of circuit 207. Terminal 609 is, for example, configured to apply, to the terminal 213 of the interface 209 of circuit 207, the signal SEL for deactivating circuit 207.

As an example, terminals 605, 607, and 609 are general purpose input-output terminals (GPIO).

Device 600 is, for example, configured to process the data signals IO0 transmitted by the terminal 215 of the interface 209 of modem 601 according to the state of the signal SEL for deactivating circuit 207. Signal SEL is, for example, a binary signal capable of being in a high state or in a low state. As an example, when signal SEL is in the high state, circuit 207 is activated or selected and exchanges data signals IO0 with modem 601. However, when signal SEL is in the low state, circuit 207 is, for example, deactivated or deselected and cannot exchange data signals IO0 with modem 601.

When signal SEL is in the low state, circuit 603 is selected or activated to communicate with modem 601. More particular, in this case, the interface 209 of circuit 603 is used to communicate with the interface 209 of modem 601. The terminal 609 of circuit 603 is then configured to apply signal RST in the low state to the terminal 213 of circuit 207. This deselects or deactivates circuit 207 for the communication with modem 601.

However, when signal SEL is in the high state, circuit 603 is deselected or deactivated to communicate with modem 601. The signal RST applied by modem 601 to the terminal 213 of the interface 209 of circuit 603 is then copied by circuit 603 on its terminal 609. This thus enables modem 601 to apply, via circuit 603, signal RST to the terminal 213 of circuit 207. When signal RST is maintained in the high state, circuit 207 is selected or activated to directly communicate with modem 601 by its interface 209, except for signal RST transmitted via circuit 603.

According for example to the targeted application, each circuit 603, 207 of device 600 may, as previously discussed in relation with FIG. 2, receive a SIM card or store a SIM profile. Circuit 603 is, for example, an embedded universal circuit card, eUICC. As a variant, circuit 603 is an integrated universal integrated circuit card, iUICC. Circuit 207 is, for example, a location intended to receive a SIM card. As an example, circuit 603 stores a SIM profile, enabling to access a network different from the network capable of being used due to a SIM card inserted in circuit 207. Circuit 603, for example, implements a subscriber identification module enabling device 600 to communicate by using the network 103 of FIG. 1. The other circuit 207 is, for example, intended to implement a subscriber identification module enabling device 600 to communicate by using the network 105 of FIG. 1.

The device 600 of FIG. 6 differs from the device 500 of FIG. 5 particularly in that the circuit 603 of device 600 comprises no communication interface 209 configured as a master, conversely to circuit 501. In particular, circuit 603 does not act as a communication bridge between modem 601 and the circuit 207 of device 600.

An advantage of the embodiment discussed hereabove in relation with FIG. 6 lies in the fact that device 600 is less complex, less expensive, and less bulky, particularly as compared with devices 400 and 500.

Figure 7:
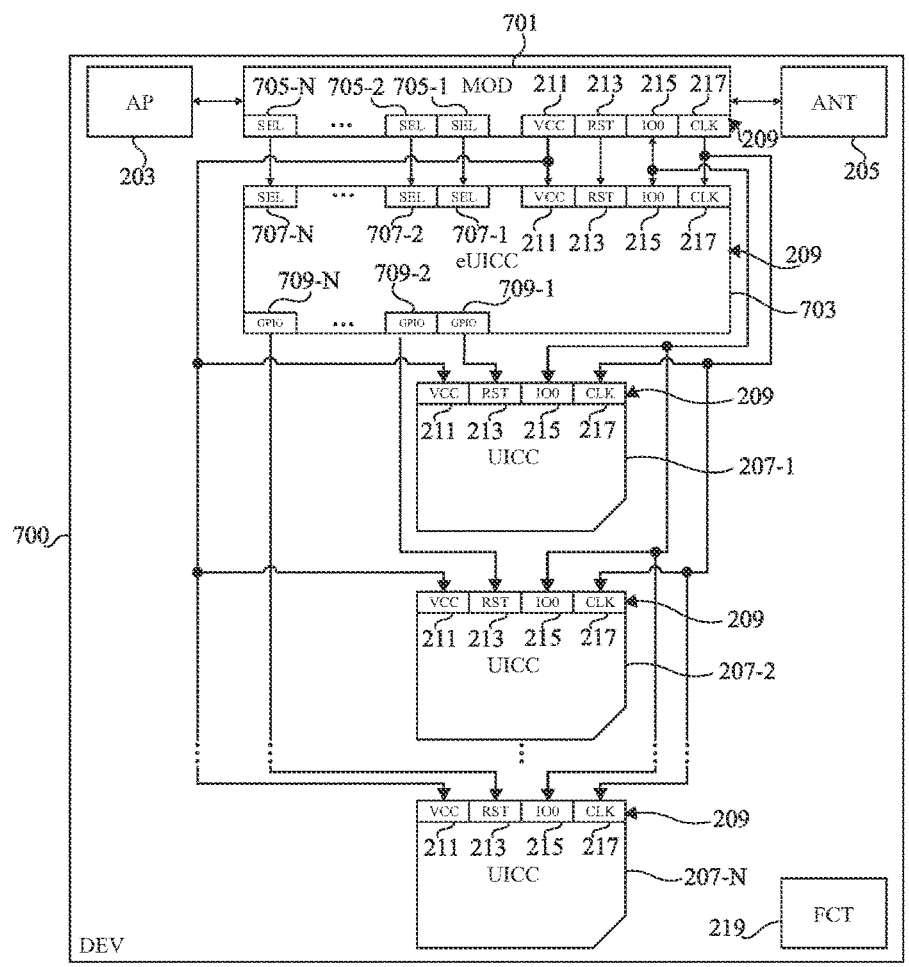
FIG. 7 schematically shows in the form of blocks another embodiment of a wireless electronic communication device.

FIG. 7 schematically shows in the form of blocks another embodiment of a wireless electronic communication device (DEV) 700 of the type of the device 100 of FIG. 1. FIG. 7 more precisely illustrates the case of a device comprising a plurality of circuits that are each configured to implement a subscriber identification module (SIM), these circuits being coupled to a same communication interface of a modem. FIG. 7, for example, illustrates a generalization of the embodiment of FIG. 6 to the case of a device comprising a plurality of circuits 207.

The device 700 of FIG. 7 comprises elements common with the device 600 of FIG. 6. Such common elements will not be detailed again hereafter. The device 700 of FIG. 7 differs from the device 600 of FIG. 6 mainly in that device 700 comprises, instead of modem 601, a modem (MOD) 701 connected to circuit (eUICC or iUICC) 703 and to N integrated circuits (UICC) 207-1, 207-2, . . . , 207-N.

In the shown example, the integrated circuits 703 and 207 (207-1, 207-2, . . . , 207-N) of device 700 are each connected to modem 701. Circuit 703, for example, comprises a single communication interface 209, for example similar to the interface 209 of circuit 603 (FIG. 6). Further, modem 701 comprises a single communication interface 209, for example, similar to that of modem 601 (FIG. 6). The communication interface 209 of circuit 703 is, for example, connected to the communication interface 209 of modem 701. The communication interface 209 of each circuit 207 is, for example, connected, except for its terminal 213, to the communication interface 209 of modem 701.

More precisely, in the shown example: the terminals 211, 213, 215, and 217 of the interface 209 of modem 701 are respectively connected to the terminals 211, 213, 215, and 217 of the interface 209 of circuit 703; and the terminals 211, 215, and 217 of the interface 209 of each circuit 207 are respectively connected to the terminals 211, 215, and 217 of the interface 209 of modem 701.

The communication interface 209 of modem 701 is, for example, connected to the communication interfaces 209 of circuits 703 and 207 by conductive tracks of a printed circuit board of device 700. As an example, the communication interfaces 209 of modem 701 and of integrated circuits 703, 207-1, 207-2, . . . , 207-N are standardized ISO 7816 communication interfaces.

In the shown example, modem 701 and circuits 703, 207-1, 207-2, . . . , 207-N exchange signals and data via their respective communication interfaces 209. For a communication between modem 701 and integrated circuits 703, 207-1, 207-2, . . . , 207-N, the interface 209 of modem 701 is, for example, configured as a master interface. The interfaces 209 of circuits 703, 207-1, 207-2, . . . , 207-N are for example configured as slave interfaces.

More precisely, in the shown example: the terminals 211 and 217 of the interface 209 of modem 701 are configured to apply signals VCC and CLK to the terminals 211 and 217 of the interface 209 of the circuit 703, 207-1, 207-2, . . . , 207-N to which they are respectively connected; the terminal 213 of the interface 209 of modem 701 is configured to apply signal RST to the terminal 213 of the interface 209 of circuit 703; and the terminal 215 of the interface 209 of modem 701 is configured to transmit data signals IO0 to the terminal 215 of the interface 209 of the circuit 703, 207-1, 207-2, . . . , 207-N to which it is connected and to receive the data signals IO0 transmitted by the terminal 215 of the interface 209 of the circuit 703, 207-1, 207-2, . . . , 207-N to which it is connected.

In the shown example, modem 701 comprises N terminals (SEL) 705-1, 705-2, . . . , 705-N. Each terminal 705 of modem 701 is, for example, connected to a terminal (SEL) 707-1, 707-2, . . . , 707-N of integrated circuit 703. Each terminal 705-1, 705-2, . . . , 705-N is, for example, configured to apply, to the associated terminal 707-1, 707-2, . . . , 707-N of circuit 703, a signal SEL-1, SEL-2, SEL-N for deactivating or deselecting circuit 207-1, 207-2, . . . , 207-N.

In the shown example, circuit 703 comprises N other terminals (GPIO) 709-1, 709-2, . . . , 709-N. Terminals 709-1, 709-2, . . . , 709-N are, for example, associated with terminals 707-1, 707-2, . . . , 707-N. Each terminal 709-1, 709-2, . . . , 709-N of circuit 703 is, for example, connected to the terminal 213 of the communication interface 209 of circuit 207-1, 207-2, . . . , 207-N. Each terminal 709-1, 709-2, . . . , 709-N is for example configured to apply, to the terminal 213 of the associated circuit 207-1, 207-2, . . . , 207-N, the signal SEL-1, SEL-2, SEL-N of circuit 207-1, 207-2, . . . , 207-N.

As an example, terminals 705 (705-1, 705-2, . . . , 705-N), 707 (707-1, 707-2, . . . , 707-N), and 709 (709-1, 709-2, . . . , 709-N) are general purpose input-output terminals (GPIO).

The operation of device 700 is similar to the operation of the previously-described device 600. Device 700 is, for example, configured to process the data signals IO0 transmitted by the terminal 215 of the interface 209 of modem 701 according to the state of the signals SEL-1, SEL-2, . . . , SEL-N. Each signal SEL-1, SEL-2, . . . , SEL-N is, for example, a binary signal capable of being in a high state or in a low state.

When signals SEL-1, SEL-2, . . . , SEL-N all are in the low state, circuit 703 is selected or activated to communicate with modem 701. More precisely, in this case, the interface 209 of circuit 703 is used to communicate with the interface 209 of modem 701. All the terminals 709-1, 709-2, . . . , 709-N of circuit 703 are then configured to apply signal RST in the low state to the terminal 213 of the interface 209 of each circuit 207-1, 207-2, . . . , 207-N. This deselects or deactivates all the circuits 207-1, 207-2, . . . , 207-N for the communication with modem 701.

However, when one of signals SEL-1, SEL-2, . . . , SEL-N is in the high state, circuit 703 is deselected or deactivated to communicate with modem 701. The signal RST applied by modem 701 to the terminal 213 of the interface 209 of circuit 703 is then copied by circuit 703 on the terminal 709-1, 709-2, . . . , 709-N connected to the selected circuit 207-1, 207-2, . . . , 207-N. This thus enables modem 701 to apply, via circuit 703, signal RST to the terminal 213 of the selected circuit 207-1, 207-2, . . . , 207-N. The other terminals 709 of circuit 703 then each transmit a signal RST in the low state to deactivate the other circuits 207.

As a variant, modem 701 transmits to circuit 703 a number N', smaller than or equal to number N, of signals SEL-1, SEL-2, . . . , SEL-N'. The respective states of signals SEL-1, SEL-2, . . . , SEL-N' for example enable to binarily code a control signal for the selection or the activation of a circuit among circuits 703, 207-1, 207-2, . . . , 207-N. The decoding of the control signal for the selection or the activation of circuit 703, 207-1, 207-2, . . . , 207-N is for example performed by circuit 703. In this variant, modem 701, for example, comprises N' terminals 705. Similarly, circuit 703, for example, comprises N' terminals 707, connected to the terminals 705 of modem 701.

As an example, number N' is equal to 2 in a case where device 700 comprises two or three circuits 207 (N=2 or 3). Number N' is for example equal to 3 in another case where device 700 comprises between four and seven circuits 207 (N=4 to 7). This advantageously enables to decrease the number of terminals 705 of modem 701 and the number of terminals 707 of circuit 703. The implementation of this variant is within the abilities of those skilled in the art based on the above indications.

According, for example, to the targeted application, each circuit 703, 207-1, 207-2, . . . , 207-N of device 700 may as previously discussed in relation with FIG. 2, receive a SIM card or store a SIM profile. Circuit 703 is, for example, an embedded universal circuit card, eUICC. Each circuit 207-1, 207-2, . . . , 207-N is, for example, a location intended to receive a SIM card. As an example, each circuit 703, 207-1, 207-2, . . . , 207-N implements a subscriber identification module enabling to access a network different from the networks capable of being used due to the subscriber identification modules implemented by the other circuits.

The embodiment discussed hereafter in relation with FIG. 7 has advantages similar to those of the embodiment discussed in relation with FIG. 6. Device 700 particularly enables to take advantage of a plurality of integrated circuits, each implementing a subscriber identification module, by using a modem advantageously comprising a single standardized ISO 7816 communication interface. Further, in device 700, only the interface 209 of modem 701 is configured as a master interface, the other interfaces 209 all being configured as slave interfaces. This decreases the complexity of device 700 with respect to a case where there would be a plurality of interfaces 209 configured as master interfaces.

Figure 8:
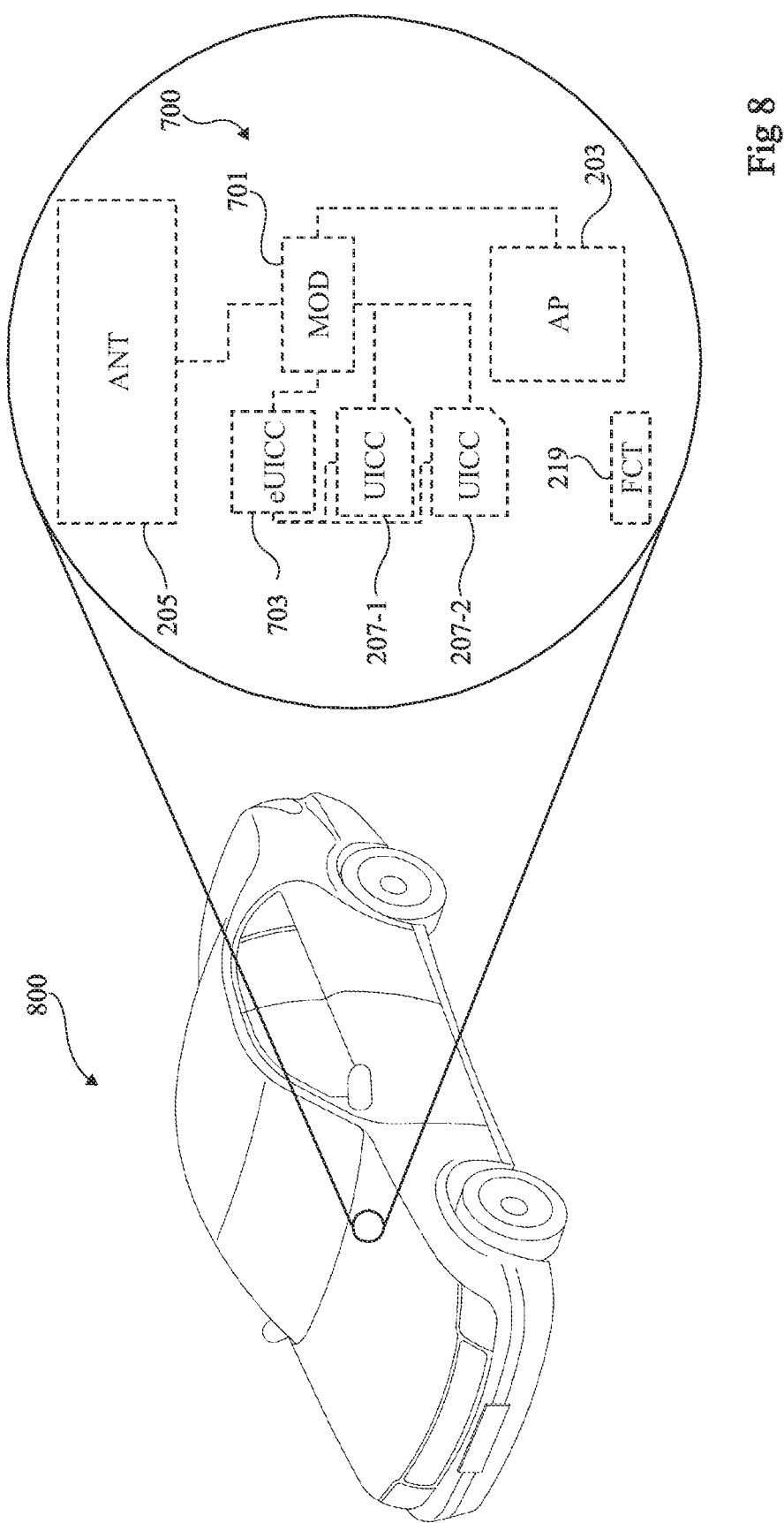
FIG. 8 shows an example of a motor vehicle comprising a wireless electronic communication device.

FIG. 8 shows an example of a motor vehicle 800 comprising wireless communication electronic device 700.

In the shown example, the electronic device 700 on board motor vehicle 800 comprises, in addition to integrated circuit 703, two integrated circuits 207-1 and 207-2 (UICC) connected to modem 701 (MOD). This advantageously enables motor vehicle 800 to communicate by using a plurality of integrated circuits each implementing a subscriber identification module, while limiting the complexity of the device 700 enabling to access these extended communication functionalities.

Various embodiments and variants have been described. Those skilled in the art will understand that certain features of these various embodiments and variants may be combined, and other variants will occur to those skilled in the art. In particular, although the described embodiments take as an example the case of a motor vehicle, those skilled in the art are capable of transposing these embodiments to any type of electronic device, particularly to cell phones.

Finally, the practical implementation of the described embodiments and variants is within the abilities of those skilled in the art based on the functional indications given hereabove. In particular, it will be within the abilities of those skilled in the art to select, for each integrated circuit 603, 703, 207, 207-1, 207-2, . . . , 207-N, the type of circuit to be used among a location intended to receive a physical UICC (SIM card), an eUICC, and an iUICC, the described embodiments being adaptable to any combination of these types of circuits.

The invention claimed is:

1. A wireless electronic device, comprising:
a modulator-demodulator circuit including a data transmit-receive terminal, a select terminal and a reset terminal;
wherein the modulator-demodulator circuit is configured to generate a select signal at the select terminal and a reset signal at the reset terminal, said reset signal for controlling reset of a first integrated circuit and activation/deactivation of at least one second integrated circuit;
wherein the first integrated circuit is configured to implement a first subscriber identity module (SIM) and including a data transmit-receive terminal, a select terminal and a reset terminal which are directly connected to the data transmit-receive terminal, select terminal and reset terminal, respectively, of the modulator-demodulator circuit and further including an input/output terminal;
wherein the first integrated circuit is activated for communication with the modulator-demodulator in response to a first logic state of the select signal and deactivated for communication with the modulator-demodulator in response to a second logic state of the select signal; and
wherein the at least one second integrated circuit is configured to implement a second subscriber identity module (SIM) and including a data transmit-receive terminal and a reset terminal, wherein the data transmit-receive terminal is directly connected to the data transmit-receive terminals of the modulator-demodulator circuit and the first integrated circuit, and wherein the reset terminal is directly connected to the input/output terminal of the first integrated circuit;
wherein the first integrated circuit is further configured, when deactivated for communication with the modulator-demodulator, to copy the reset signal received from the modulator-demodulator for output at the input/output terminal; and
wherein the second integrated circuit is activated for communication with the modulator-demodulator in response to a first logic state of the reset signal and deactivated for communication with the modulator-demodulator in response to a second logic state of the reset signal.

2. The device according to claim 1, wherein each of the modulator-demodulator circuit, the first integrated circuit and the at least one second integrated circuit includes a clock terminal, and wherein the modulator-demodulator circuit is configured to apply, through its clock terminal to the clock terminals of the first integrated circuit and the at least one second integrated circuit, a clock signal.

3. The device according to claim 1, wherein each of the modulator-demodulator circuit, the first integrated circuit and the at least one second integrated circuit includes a power supply terminal, and wherein a power supply voltage is applied to the power supply terminals of the modulator-demodulator circuit, the first integrated circuit and the at least one second integrated circuit.

4. The device according to claim 1, wherein the first integrated circuit is one of: an embedded universal integrated circuit card (eUICC) and an integrated universal integrated circuit card (iUICC).

5. The device according to claim 4, wherein the at least one second integrated circuit is an integrated circuit selected from the group consisting of:
a location configured to receive a universal integrated circuit card;
an embedded universal integrated circuit card (eUICC); and
an integrated universal integrated circuit card (iUICC).

6. The device according to claim 1, wherein the first integrated circuit is deactivated when the at least one second integrated circuit is activated, and vice versa.

7. A motor vehicle, comprising a device according to claim 1.

8. A wireless electronic device, comprising:
a modulator-demodulator circuit having a first control terminal and a first reset terminal;
a first integrated circuit having a second control terminal directly connected to the first control terminal and having a second reset terminal directly connected to the first reset terminal, the first integrated circuit configured to implement a first subscriber identity module (SIM); and
at least one second integrated circuit configured to implement a second subscriber identity module (SIM);
wherein a data transmit-receive terminal of the first integrated circuit and a data transmit-receive terminal of the at least one second integrated circuit are both directly connected to a data transmit-receive terminal of the modulator-demodulator circuit;
wherein the modulator-demodulator controls activation/deactivation of the first integrated circuit through a first control signal output from the first control terminal and controls activation/deactivation of the at least one second integrated circuit through a second control signal output from the first reset terminal; and
wherein a reset terminal of the at least one second integrated circuit is directly connected to an input/output terminal of the first integrated circuit, and wherein said first integrated circuit is configured, when the first control signal deactivates the first integrated circuit, to receive and copy the second control signal for output at said input/output terminal for controlling activation/deactivation of the at least one second integrated circuit.

9. The device according to claim 8, wherein the second control signal output by the modulator-demodulator circuit is a reset signal.

10. The device according to claim 8, wherein a sequencing terminal of the first integrated circuit and a sequencing terminal of the at least one second integrated circuit are connected to a sequencing terminal of the modulator-demodulator circuit.

11. The device according to claim 8, wherein a power supply terminal of the first integrated circuit and a power supply terminal of the at least one second integrated circuit are connected to a power supply terminal of the modulator-demodulator circuit.

12. The device according to claim 8, wherein the second control terminal is a select terminal of the first integrated circuit and the first control terminal is a select terminal of the modulator-demodulator circuit.

13. The device according to claim 8, wherein the data transmit-receive terminals of the modulator-demodulator circuit, the first integrated circuit and the at least one second integrated circuit are part of a standardized ISO 7816 communication interface.

14. The device according to claim 8, wherein the first integrated circuit is one of: an embedded universal integrated circuit card (eUICC) and an integrated universal integrated circuit card (iUICC).

15. The device according to claim 8, wherein the at least one second integrated circuit is a circuit selected from the group consisting of:
a location intended to receive a universal integrated circuit card;
an embedded universal integrated circuit card (eUICC); and
an integrated universal integrated circuit card (iUICC).

16. The device according to claim 8, wherein the first integrated circuit is deactivated when the at least one second integrated circuit is activated, and vice versa.

17. A motor vehicle, comprising a device according to claim 8.

18. A wireless electronic device, comprising:
a modulator-demodulator circuit;
a first integrated circuit configured to support implementation of a first subscriber identity module (SIM); and
at least one second integrated circuit configured to support implementation of a second subscriber identity module (SIM);
wherein a data transmit-receive terminal of the first integrated circuit and a data transmit-receive terminal of the at least one second integrated circuit are both connected to a data transmit-receive terminal of the modulator-demodulator circuit; and
wherein a reset terminal of the modulator-demodulator circuit is directly connected to a reset terminal of the first integrated circuit and a select terminal of the modulator-demodulator circuit is directly connected to a select terminal of the first integrated circuit;
wherein said modulator-demodulator circuit is configured to generate a reset signal at its reset terminal for controlling reset of the first integrated circuit and activation/deactivation of the at least one second integrated circuit;
wherein said modulator-demodulator is configured to generate a select signal at its select terminal for controlling activation/deactivation of the first integrated circuit; and
wherein a reset terminal of the at least one second integrated circuit is directly connected to an input/output terminal of the first integrated circuit, and wherein said first integrated circuit is configured, when the select signal deactivates the first integrated circuit, to receive and copy the reset signal for output at said first terminal for controlling activation/deactivation of the at least one second integrated circuit.

19. The device according to claim 18, wherein a sequencing terminal of the first integrated circuit and a sequencing terminal of the at least one second integrated circuit are connected to a sequencing terminal of the modulator-demodulator circuit.

20. The device according to claim 18, wherein a power supply terminal of the first integrated circuit and a power supply terminal of the at least one second integrated circuit are connected to a power supply terminal of the modulator-demodulator circuit.

21. The device according to claim 18, wherein the data transmit-receive terminals of the modulator-demodulator circuit, the first integrated circuit and the at least one second integrated circuit are part of a standardized ISO 7816 communication interface.

22. The device according to claim 18, wherein the first integrated circuit is one of: an embedded universal integrated circuit card (eUICC) and an integrated universal integrated circuit card (iUICC).

23. The device according to claim 18, wherein the at least one second integrated circuit is a circuit selected from the group consisting of:
   a location intended to receive a universal integrated circuit card;
   an embedded universal integrated circuit card (eUICC); and
   an integrated universal integrated circuit card (iUICC).

24. The device according to claim 18, wherein the first integrated circuit is deactivated when the at least one second integrated circuit is activated, and vice versa.

25. A motor vehicle, comprising a device according to claim 18.

* * * * *